United States Patent
Correia Villa Real et al.

(10) Patent No.: US 10,885,624 B2
(45) Date of Patent: Jan. 5, 2021

(54) IMAGE-BASED ORIGIN VALIDATION

(71) Applicant: INTERNATIONAL BUSINESS MACHINES CORPORATION, Armonk, NY (US)

(72) Inventors: Lucas Correia Villa Real, Sao Paulo (BR); Vagner Figueredo de Santana, São Paulo (BR); Priscilla Barreira Avegliano, Apto (BR); Carlos Henrique Cardonha, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 16/244,196

(22) Filed: Jan. 10, 2019

(65) Prior Publication Data
US 2020/0226741 A1 Jul. 16, 2020

(51) Int. Cl.
*G06T 7/00* (2017.01)
*G06T 7/70* (2017.01)
*G06T 7/62* (2017.01)

(52) U.S. Cl.
CPC .............. *G06T 7/0004* (2013.01); *G06T 7/62* (2017.01); *G06T 7/70* (2017.01); *G06T 2207/30108* (2013.01)

(58) Field of Classification Search
CPC ........... G06T 7/0004; G06T 7/62; G06T 7/70; G06T 2207/30108; G06T 2207/20081;
(Continued)

(56) References Cited

U.S. PATENT DOCUMENTS

2005/0013472 A1* 1/2005 Gauthier ............ G05B 19/4183
382/141
2006/0260718 A1 11/2006 Neglay et al.
(Continued)

FOREIGN PATENT DOCUMENTS

CN 106790003 A 5/2017
CN 106815330 A 6/2017
(Continued)

OTHER PUBLICATIONS

An algorithm for automatic detection of pole-like street furniture objects from Mobile Laser Scanner point clouds—Cabo (Year: 2014).*
(Continued)

*Primary Examiner* — Nimesh Patel
(74) *Attorney, Agent, or Firm* — Cantor Colburn LLP; Joseph Petrokaitis

(57) ABSTRACT

A technique relates to a manufacturing process. A computer system receives a material identification of a resource being manufactured, and receives images captured of units of the resource, the resource having been cut into the units. Features are determined for each of the units from the images. Feature vectors are created on a one-to-one basis for each of the units. A blockchain is formed using the feature vectors associated with each of the units, the blockchain having the material identification of the resource and a certificate identifying the units. A feasibility of the certificate for the units of the resource is validated via the blockchain.

20 Claims, 9 Drawing Sheets

(58) Field of Classification Search
CPC ......... G06T 1/0007; G06T 2207/10004; G06T 2207/10032; G06T 2207/10088; G06T 2207/30004; G06T 2207/30132; G06T 2207/30161; G06T 2207/30204; G06T 2207/30232; G06T 5/001; G06T 7/292; G06T 13/40; G06T 19/003; G06T 19/20; G06T 2200/04; G06T 2207/10012; G06T 2207/10028; G06T 7/10; G06T 7/11; G06T 19/006; G06T 2200/16; G06T 7/44; G06T 7/73; H04L 2209/38; H04L 9/3239; H04L 9/0637; H04L 9/3236; H04L 9/3247; H04L 67/12; H04L 63/0876; H04L 9/3231; H04L 63/0428; H04L 63/0442; H04L 63/123; H04L 63/126; H04L 9/0643; H04L 63/0861; H04L 9/3073; H04L 67/22; H04L 67/303; G06F 21/6245; G06F 21/31; G06F 21/64; G06F 2221/2111; G06F 16/9554; G06F 21/45; G06F 3/014; G06F 16/2246; G06F 16/2365; G06F 16/2379; G06F 16/28; G06F 16/282; G06F 16/51; G06F 16/9537; G06F 3/04815; G06F 1/163; G06F 3/00; G06F 2203/011; G06F 3/017; G06F 2212/1052; G06F 16/29; G06F 21/00; G06F 16/583; G06F 16/5866; G06F 16/22; G06F 3/002; G06F 17/40; G06F 16/9577; G06F 11/3688; G06F 21/32; G06F 3/0482; G06F 11/1469; G06F 16/1837; G06F 16/285; G06F 16/40; G06F 16/951; G06F 16/954; G06F 16/958; G06F 2221/2149; G06Q 20/389; G06Q 20/401; G06Q 20/3224; G06Q 30/0185; G06Q 20/405; G06Q 50/265; G06Q 20/02; G06Q 20/38215; G06Q 20/3823; G06Q 20/40145; G06Q 50/18; G06Q 10/0631; G06Q 10/0633; G06Q 10/20; G06Q 20/3278; G06Q 30/0248; G06Q 30/0255; G06Q 50/01; G06Q 50/08; G06Q 2220/00; G06Q 20/3678; G06Q 20/36; G06Q 20/3829; G06Q 20/4016; G06Q 20/0855; G06Q 20/382; G06Q 20/40; G06Q 20/3674; G06Q 10/00; G06Q 10/08; G06Q 20/227; G06Q 10/087; G06Q 20/4014; G06Q 10/103; G06Q 30/0631; G06Q 30/0643; G06Q 10/10; G06Q 30/0261; G06Q 50/184; G06Q 10/06; G06Q 10/06311; G06Q 20/1235; G06Q 30/0282; G06Q 30/0611; G06Q 30/0627; G06Q 30/0637; G06Q 50/10; G16H 10/60; G16H 15/00; G16H 50/20; G16H 20/30; G16H 50/30; G16H 10/40; G16H 30/20; G16H 30/40; G16H 80/00; H04W 12/02; H04W 12/06; H04W 12/08; H04W 84/18; H04W 12/00512; H04W 4/40; H04W 4/70; A61B 5/11; A61B 5/6804; A61B 5/0022; A61B 5/0024; A61B 5/681; A61B 5/6895; A61B 5/7282; A61B 2562/0219; A61B 5/01; A61B 5/024; A61B 5/0205; A61B 5/4064; G06K 9/00342; G06K 7/10722; G06K 7/12; G06K 7/1413; G06K 7/1417; G06K 9/6267; G06K 9/6277; G06K 2209/15; G06K 7/1408; G06K 9/00288; G06K 9/00785; G06K 9/00892; G06K 9/4604; G06K 9/60; G06K 9/627; G06K 9/00355; G06K 9/00671; G06K 19/06037; G06K 9/00664; G06K 9/00684; G06K 9/20; G06K 9/209; G06K 9/6282; G06K 9/66; G06K 9/6232; G06K 9/0063; G06K 9/00711; G06K 9/00805; G06K 9/2063; G06K 9/3233; G06N 7/005; G06N 3/0454; G06N 20/00; G06N 3/08; G06N 20/10; G06N 3/0436; G06N 3/082; G06N 3/088; G06N 5/04; G02B 2027/0138; G02B 27/0172; G02B 2027/014; G02B 27/0093; B33Y 70/00; B33Y 80/00; G01N 2021/8416; G01N 21/3563; G01N 21/359; G01N 21/643; G01N 21/898; G01N 21/8986; G01N 21/94; G01N 33/02; G01N 33/18; G01N 33/1826; G01N 33/2882; G01N 33/46
See application file for complete search history.

(56) References Cited

U.S. PATENT DOCUMENTS

| | | | |
|---|---|---|---|
| 2007/0119518 A1* | 5/2007 | Carman | B07C 5/14 144/356 |
| 2015/0134500 A1 | 5/2015 | Hindman | |
| 2017/0103167 A1* | 4/2017 | Shah | G06Q 50/24 |
| 2018/0173203 A1 | 6/2018 | Freer et al. | |
| 2019/0370634 A1* | 12/2019 | Ferreira Moreno | G06N 3/08 |

FOREIGN PATENT DOCUMENTS

| | | |
|---|---|---|
| JP | 5274235 B2 | 8/2013 |
| WO | 2005124323 A1 | 12/2005 |

OTHER PUBLICATIONS

Hang-Jun Wang et al.; "Wood Recognition Using Image Texture Features"; PLOS One; Oct. 2013, vol. 8, Issue 10; 12 pages.

* cited by examiner

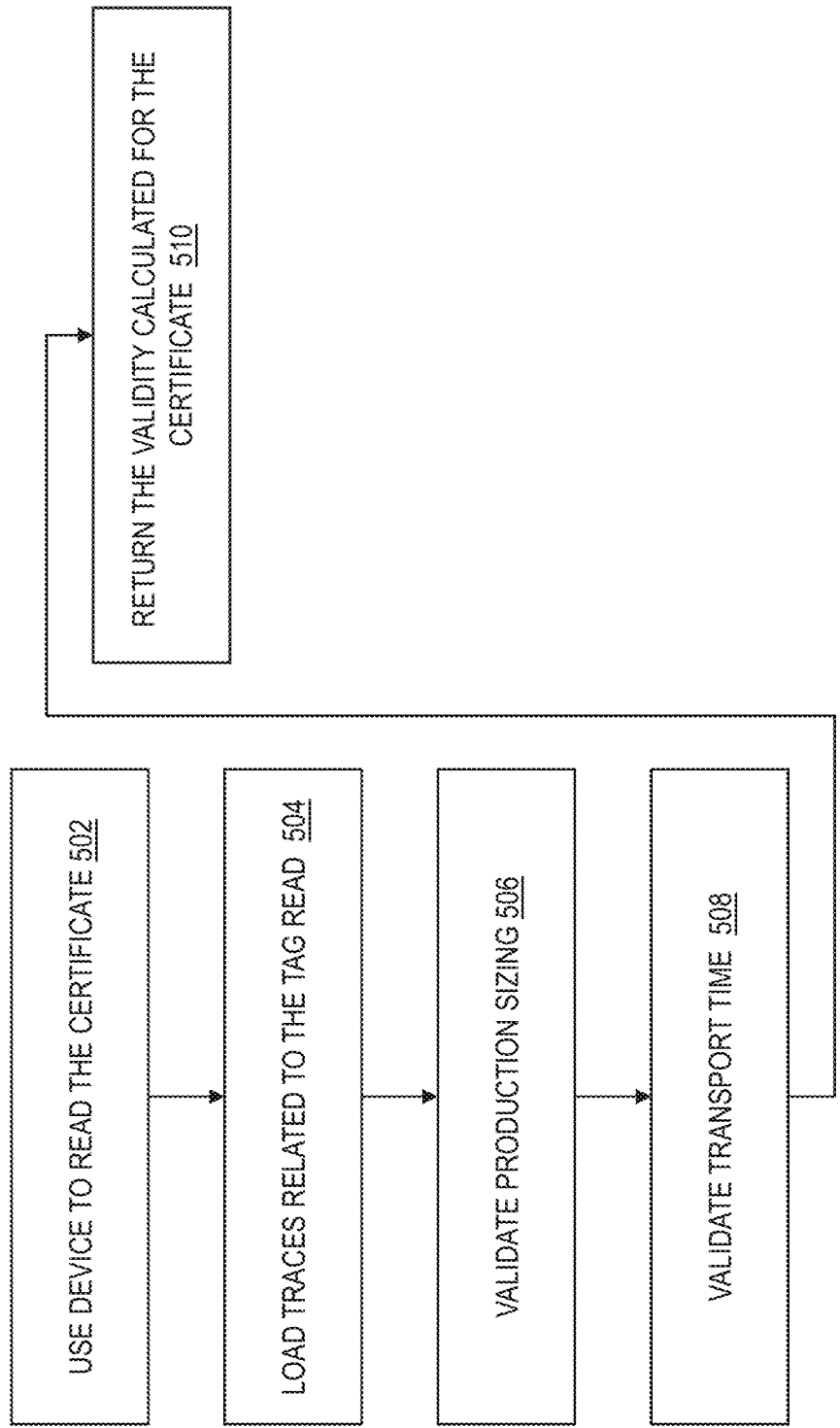

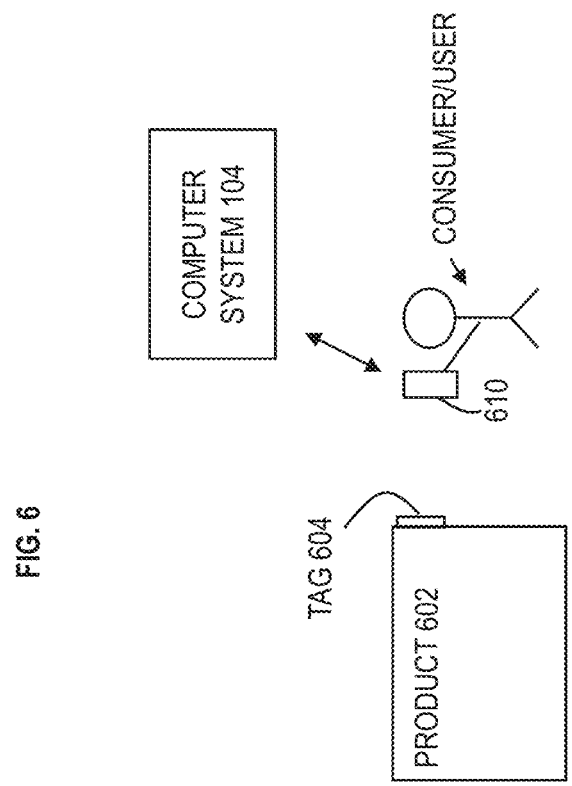

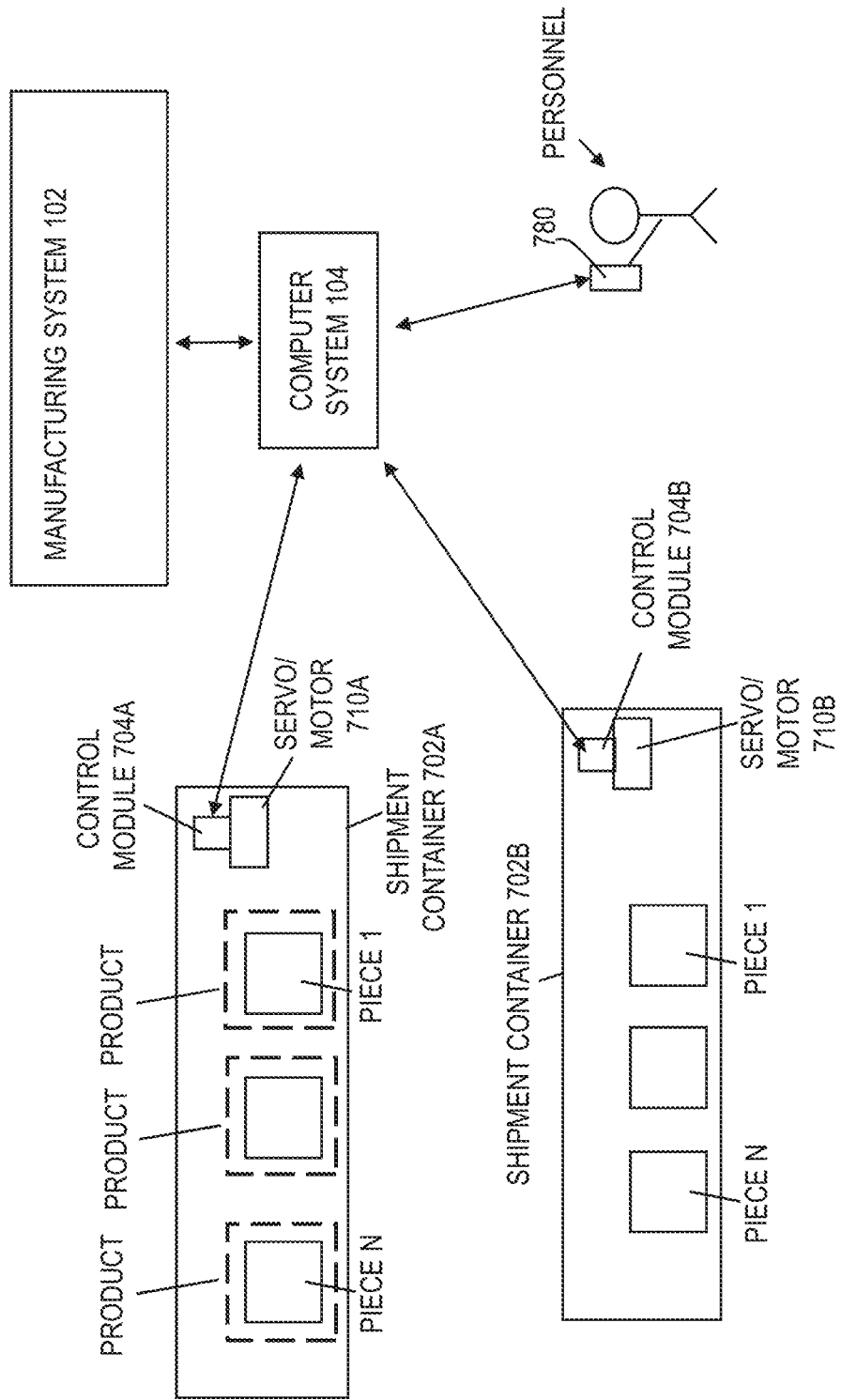

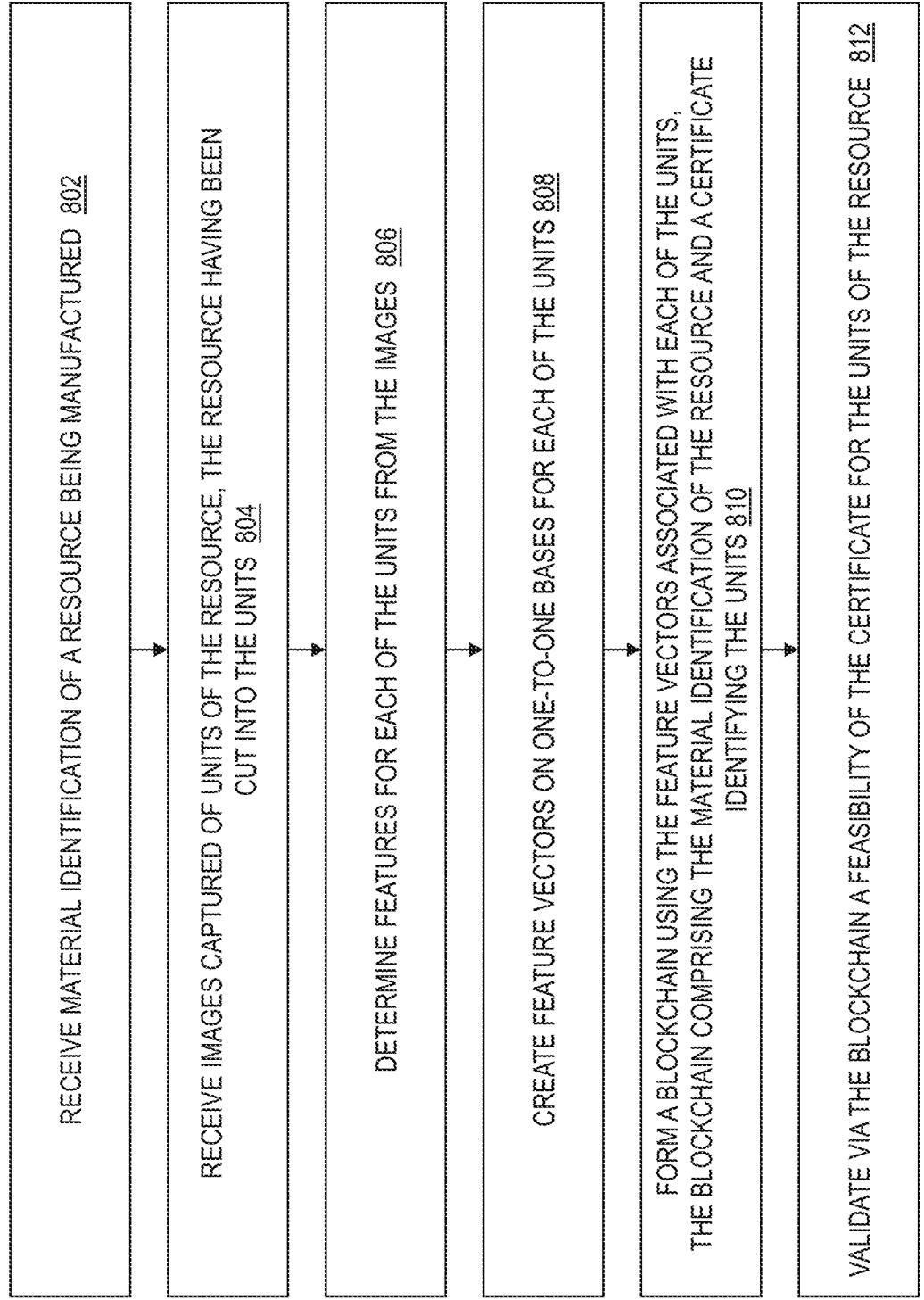

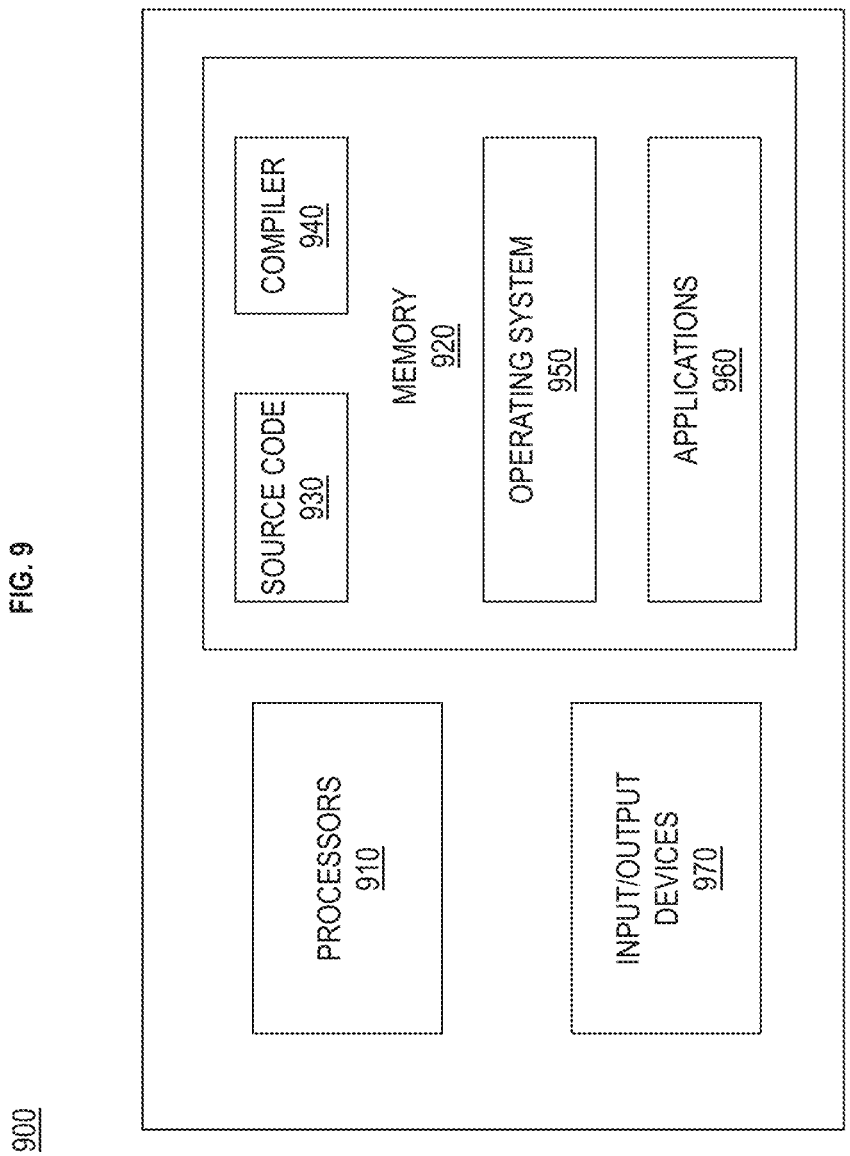

IMAGE-BASED ORIGIN VALIDATION

BACKGROUND

The present invention generally relates to computer systems, and more specifically, to computer systems, computer-implemented methods, and computer program products configured to utilize image analysis to support origin validation in a variety of processes.

The term "validation" has been used to refer generally to the successful demonstration that any process, procedure, method, or activity actually and consistently fulfills specific requirements. For example, in wood processing, machinery and computer control techniques can examine a log or other materials and use the material's naturally occurring features (e.g., end grain patterns) to uniquely identify the material for later recognition in another part of a process. A unit of raw or in process material is scanned using conventional electronic methods to identify unique, naturally occurring characteristics. These characteristics are classified and recorded, and then become the unique identifiers or a "fingerprint" for the material.

SUMMARY

Embodiments of the invention are directed to computer-implemented method for a manufacturing process. A non-limiting example of the method includes receiving, by a computer system, a material identification of a resource being manufactured, and receiving images captured of units of the resource, the resource having been cut into the units. The method includes determining features for each of the units from the images, creating feature vectors on a one-to-one basis for each of the units, forming a blockchain using the feature vectors associated with each of the units, the blockchain having the material identification of the resource and a certificate identifying the units. Also, the method includes validating via the blockchain a feasibility of the certificate for the units of the resource.

Embodiments of the invention are directed to a system for a manufacturing process. A non-limiting example of the system includes a processor and memory having computer-executable instructions that, when executed by the processor, cause the processor to perform a method. A non-limiting example of the method includes receiving a material identification of a resource being manufactured, receiving images captured of units of the resource, the resource having been cut into the units, determining features for each of the units from the images, and creating feature vectors on one-to-one basis for each of the units. Also, the method includes forming a blockchain using the feature vectors associated with each of the units, the blockchain having the material identification of the resource and a certificate identifying the units, and validating via the blockchain a feasibility of the certificate for the units of the resource.

Embodiments of the invention are directed to a computer program product for a manufacturing process, the computer program product having a computer readable storage medium having program instructions embodied therewith. The computer readable storage medium is not a transitory signal per se, are the program instructions executable by a computer cause the computer to perform a method. A non-limiting example of the method includes receiving, by the computer, a material identification of a resource being manufactured, receiving images captured of units of the resource, the resource having been cut into the units, determining features for each of the units from the images, and creating feature vectors on one-to-one basis for each of the units. Also, the method includes forming a blockchain using the feature vectors associated with each of the units, the blockchain having the material identification of the resource and a certificate identifying the units, and validating via the blockchain a feasibility of the certificate for the units of the resource.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flowchart of a method of validating a certificate of the blockchain related to production process of pieces of the resource according to embodiments of the invention;

FIG. 6 depicts a device that scans/reads information of a product linked to the origin of the product according to embodiments of the invention;

FIG. 7 depicts a diagram of a computer system controlling movement/transportation of pieces of the resource and/or products derived from the resource according to embodiments of the invention;

FIG. 8 depicts a flowchart of a computer implemented method for a manufacturing process according to embodiments of the invention; and FIG. 9 depicts a computer having functions and operations which can be utilized in according to embodiments of the invention.

Figure 1:
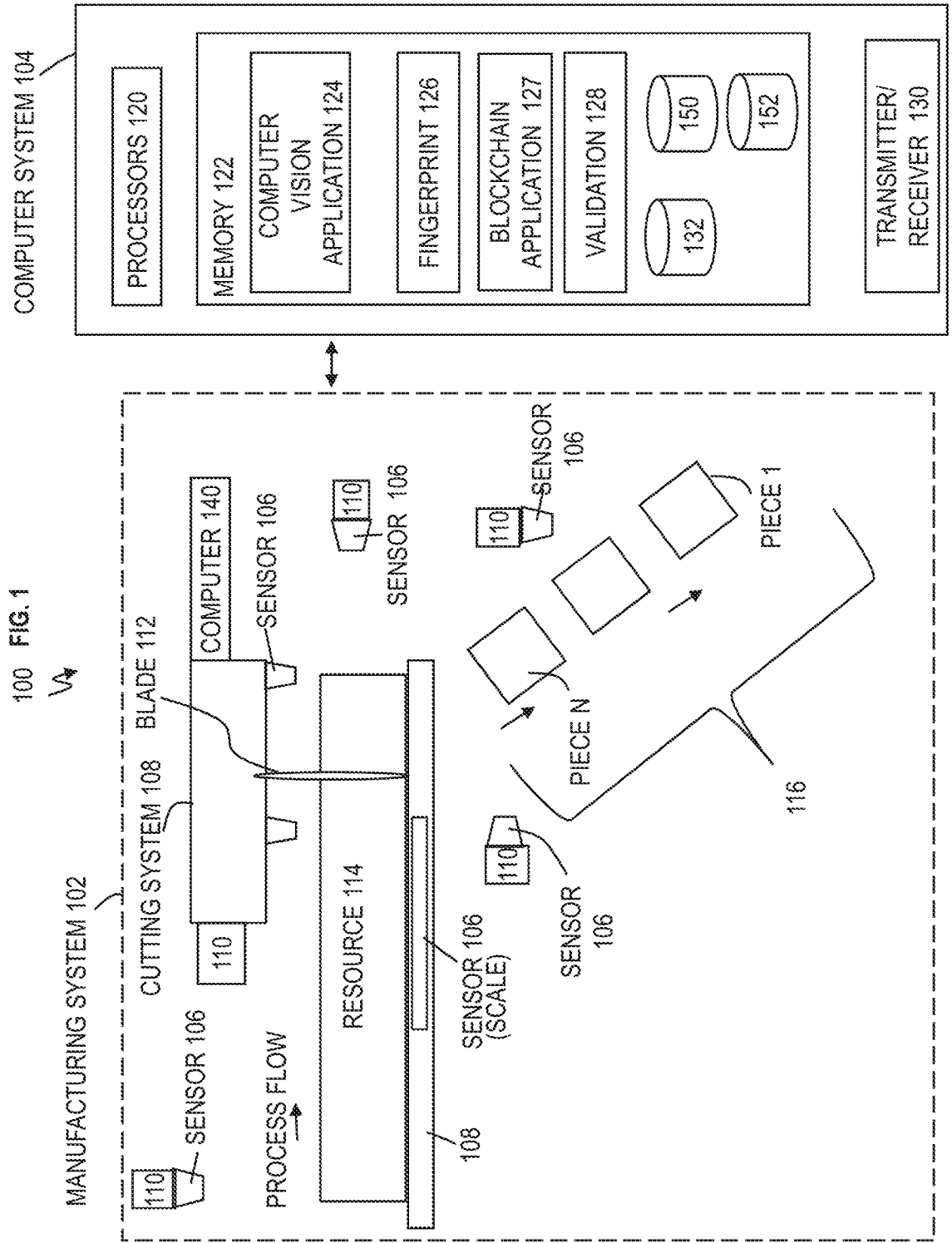
FIG. 1 depicts a system for identifying resources in a manufacturing process and validating the resources according to embodiments of the invention

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the

DETAILED DESCRIPTION

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, as the complexity of raw material processing increases and with the advancements in internal and external scanning methods, it becomes impractical or expensive to perform an exhaustive analysis of a piece of the raw material at the point of processing. It is often better to examine the unit earlier, where there is more time and space. To be useful, this information is stored and later correlates back to the specific unit. Currently, this requires a bar code or other marking system, which places a physical mark or tag on the piece. This mark or tag can be difficult and expensive to apply, cosmetically undesirable, lost, and unreadable. Also, the mark or tag can interfere with the processing and contain by products and waste material.

For example, in the processing of logs, the mass of information being evaluated in creating a valuable solution for sawing the log can require more time than is practically acceptable in a production-oriented setting. As a result, the individual log/lumber could be pre-scanned or pre-evaluated with a system that is not in the critical time path. By scanning and evaluating the lumber or log prior to the processing procedure, the predetermined solution can be ready for immediate implementation during the processing procedure.

Many concerns have been raised about the authenticity and origin of natural resources such as wood. Retailers, consumers, and forest advocates seek to ensure that wood products, such as flooring, furniture, lumber, etc., reaching stores are legitimately sourced, legally logged, and/or imported/exported from the location and country that is listed.

Turning now to an overview of the aspects of the invention, one or more embodiments of the invention provide incorporation of computer vision as part of manufacturing processes to capture features from objects and use them as input information for blockchain. These features can then be used to verify product origin based on its visual properties. Unlike state-of-the-art solutions, embodiments of the invention utilize visual features to input information automatically in manufacturing processes, thereby avoiding input errors and supporting adoption of blockchain technology. Further, embodiments of the invention prevent frauds by checking the viability of the reported origin.

It is expected that use of blockchain will be pervasive in manufacturing processes. However, manual input when creating blocks of the blockchain can result in errors or fraud. For example, producers can fake a block to indicate that many of their products came from a given tree, when in reality that tree did not have the claimed amount of wood to begin with. Embodiments of the invention are directed to validating the viability of production processes supported by blockchain, especially those relating to exploration of natural resources, such as but not limited to wood, stone, etc., which are capable of being having unique visual aspects.

However, previous solutions in the state-of-the-art fail to incorporate validation of the information input into the system, are susceptible to errors and fraud, usually implement a single tracking mechanism, such as RFID, and utilize tags or markers that can cause visible alterations to the product.

Further regarding blockchain technology, a blockchain, originally block chain, is a growing list of records, called blocks, which are linked using cryptography. Each block contains a cryptographic hash of the previous block, a timestamp, and transaction data (generally represented as a merkle tree root hash). By design, a blockchain is resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Therefore, alteration of data in a blockchain is recognized by those viewing the data.

Turning now to a more detailed description of aspects of the present invention, FIG. 1 depicts a system 100 for identifying resources in a manufacturing process and validating the resources according to embodiments of the invention. A manufacturing system 102 is coupled to a computer system 104. The manufacturing system 102 includes a cutting system 108 for cutting a resource 114 and numerous sensors 106 positioned on and around the cutting system 108. The cutting system 108 includes one or more blades or saw blades 112 for cutting the resource 114 as the resource 114 travels along the bed in the arrow of the process flow direction. The resource 114 can be cut into pieces 116 as discussed further below, all while the sensors 106 collect data on the resource 114 prior to, during, and after the cutting. The pieces 116 can also be referred to as units.

In some implementations, the manufacturing system 102 can be harvester machine mounted system for harvesting the resource 114. The manufacturing system 102 is located at the location where the natural resource 114 was harvested. For example, the location is in a country (which is the country of origin). Particularly, the location is the state, township, city, province, county, etc., within the country. The location can also include geological coordinates such as latitude and longitude.

Figure 3:
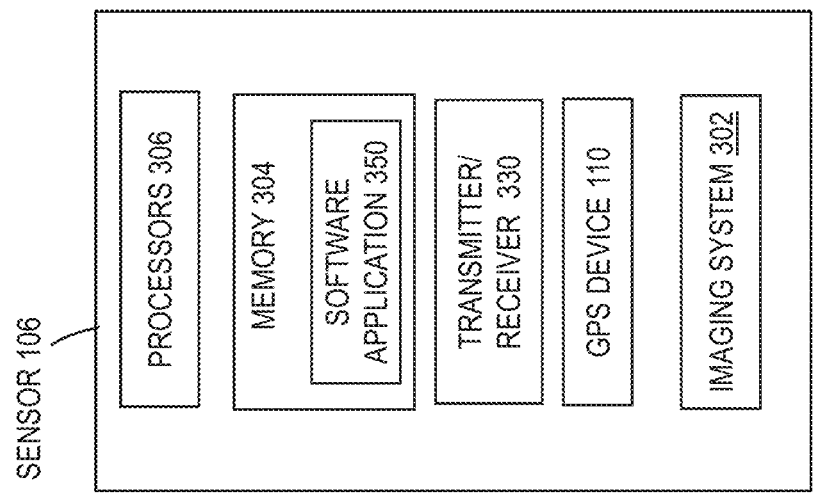
FIG. 3 depicts an example sensors according to embodiments of the invention.

One or more global positioning system (GPS) devices 110 can be mounted on the cutting system 108 to determine location. Additionally, each of the sensors 106 can include its own GPS device 110 for determining its respective location as depicted in FIG. 3. The sensor 106 can include an imaging system 302, memory 304, processors 306, weigh scale (not shown), transmitter/receiver 330, and software applications 350 depicted in FIG. 3. The software application 350 is configured to automatically retrieve location information from the GPS device 110. The location information of the resource 114 is automatically gathered, stored, and transmitted by the transmitter/receiver 330 of the sensors 106 to the computer system 104. One or more sensors 106 can be tasked with collecting the location information from all GPS devices 110 and providing the location information to the computer system 104. The location information gathered by the sensors 106 can be compared by the computer system 104 to determine that the location confirms that the GPS devices 110 are within a predefined proximity of each other. Similarly, one or more sensors 106 can be tasked with collecting the sensor data and providing it to the computer system 104. Alternatively and/or additionally, each sensor 106 can provide its own sensor data and location information to the computer system 104.

In some embodiments of the invention, the manufacturing system 102 can include and/or be coupled to a computer 140 having a processor configured to execute computer executable instructions. The computer 140 is configured to coordinate with all of the sensors 106 and GPS devices 110 and send this location information and sensor information to the computer system 104. The computer 140 is configured to control the process flow of the resource 114 to ensure that the speed of the resource 114 is acceptable for the sensors 106 to capture the information. The computer 140 can also serve as an interface for operating the cutting system 108.

The computer system 104 can couple to and communicate with any element in the manufacturing system 102 including the sensors 106, GPS device 110, computer 140, and so forth. The computer system 104 includes one or more processors 120 configured to execute software executable instructions in memory 122. The memory 122 can include or access computer vision software application 124, fingerprint software application 126, blockchain software applications 127, validation software applications 128, etc. The computer system 104 includes a transmitter/receiver 130 for communication. The sensors 106, GPS devices 110, and computer 140 can each include transmitters/receivers for communication back and forth with each other and the computer system 104.

The resource 114 is a material, and wood is discussed in some example scenarios for illustration but the natural resource 114 is not meant to be limited to wood. As an example, the resource 114 can be a tree and can be placed on the bed of the cutting system 108 to be cut into smaller pieces 116 which are units of the raw material. The resource 114 (tree) can be cut into pieces 1-N, where N is the last piece or unit from the resource 114.

The sensors 106 are not meant to be limited to any one type. The sensors 106 are configured to perform various types of conventional scanning and the computer system 104 is configured to perform various computations on the scanned data via the computer vision software application 124, fingerprint software applications 126, blockchain software applications 127, and/or validation software applications 128. For example, the scanning via sensor 106 and computation via the computer vision software application 124 can occur to determine aspects of the material (of the resource 114 as a whole and the individual pieces 1-N) such as size, weight, color, content, defects, shape, etc. The data is stored in a database 132 by the computer system 104 with the assigned "natural fingerprint" via the fingerprint application 126 much like a conventional bar code but without the need to ever physically mark or tag the unit.

After the resource 114 is cut, a unit of raw or in process material can include whole tree stems, wood logs, wood pieces, and/or include units of materials such as granite blocks, rocks, stones, and so forth. The scanning is automatically performed using, for example, conventional methods via the sensors 106 to identify unique, naturally occurring characteristics. These methods via the sensors 106 can include examining on one or more surfaces or internally using conventional methods such as visual imaging, infrared imaging, ultraviolet imaging, x-ray imaging, ultrasonic imaging, spectral imaging, and/or other imaging systems that derive geometric, physical, chemical, and/or other unique external and internal characteristics.

The characteristics can include natural or created defects such as knots, grain, splits, colors, shape, density, wane, dimensions, and so forth. The characteristics can include defects of wood units, fissures, aggregate content, color, internal structure, geometric shape, etc., and defects of mineral units, color, weight, content, shape, etc.

These characteristics can be automatically determined and classified by a combination of the computer vision application 124 and/or the fingerprint application 126, where the classification can be based on a combination of characteristics such as color, contrast, density, composition, size, and shape, and their relative locations or patterns; this classification is recorded by computer system 104 and then becomes the unique identifier or "fingerprint" for the material via the fingerprint application 126. Further scanning via sensors 106 and computation via computer system 104 can occur to acquire other characteristics such as overall size and shape or internal features to be used to determine the optimum utilization (other aspects can include weight, color, content, defects, shape, etc.).

Figure 2:
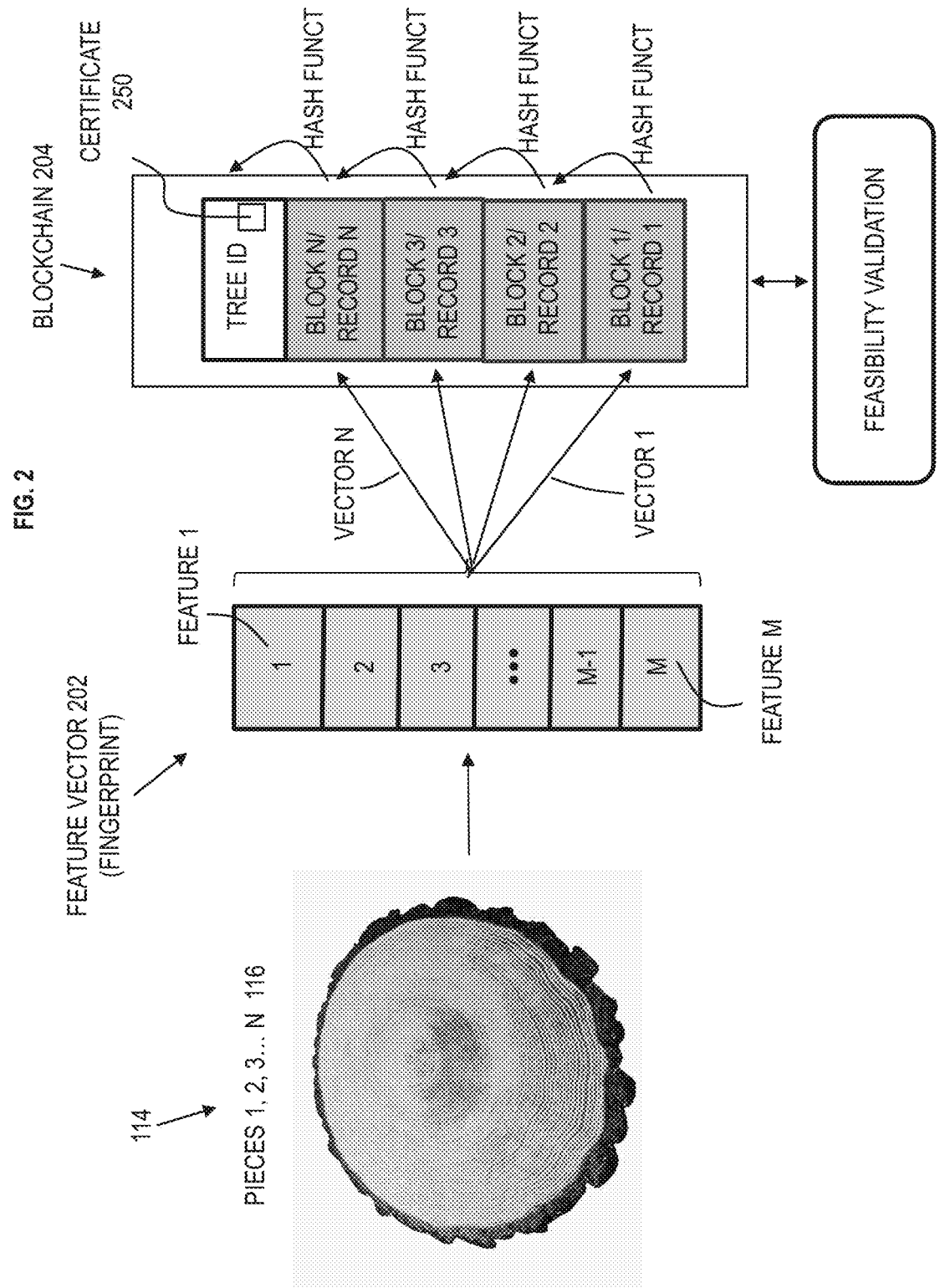
FIG. 2 depicts an example conversion process used to create a blockchain related to the resource according to embodiments of the invention.

FIG. 2 depicts an example automatic conversion process according to embodiments of the invention. As noted above, the imaging systems 302 of sensors 106 automatically scan the entire resource 114 (e.g., tree) and the data of the resource 114 is given a tree/material identification, for example, tree ID 1. The software application 350 of the sensor 106 and/or the computer vision application 124 (and/or the fingerprint application 126) are configured to automatically provide the tree identification. Each of the sensors 106 includes an imaging system 302 and some include a weigh scale, along with the GPS device 110. Each of the pieces 1-N can have a separate weight (measured separately), and/or accounted for by noting the weight of the resource 114 after the removal of each piece 1-N until the last piece remains.

The resource 114 has been cut into pieces 1-N. The computer system 104 is configured to perform the following process for each piece 1-N 116. For each piece 1-N 116, the computer vision application 124 is configured to receive from the sensors 106 the data of the scan for the entire resource 114 (log), and for each individual piece 1-N. The computer vision application 124 includes image processing software instructions to process and determine characteristics of the entire resource 114 and its resulting pieces 1-N 116. For each piece 1-N 116, the fingerprint application 126 is configured to generate a feature vector 202 (i.e., fingerprint) with features 1-M, which are data structures to be filled by characteristics scanned from the pieces 1-N, where M is the last of the features in the feature vector 202. For each piece 1-N, the fingerprint application 126 is configured to extract the characteristics processed by the computer vision application 124 and load these characteristics in predefined data structures as features 1-M in the feature vector 202. Features and characteristics can be used interchangeably.

The vector 202 of features 1-M describing the fingerprint of a piece of wood could be composed of several elements, such as, but not limited to the following (along with any other features/characteristics discussed herein):

1) Color volume which represents the volume of piece containing a given color. For example, for each possible color, there is a predefined position (i.e., one position) in the vector, which would contain the respective volume.

2) Lattice description which divides a piece in lattice and assigns most frequent color to each square in the lattice so as to form a compact representation of the piece. For each square in the lattice, there is one entry in the vector containing the color (ID, red, green, blue (RGB) code).

3) Shape representation in which shapes are described as functions, which can be represented, e.g., as mixtures of Gaussians. The parameters on vector would be the parameters of these Gaussian distributions.

4) Number and length of rings. For each ring, one element on the vector of features contains the length of the ring.

5) Distance between rings. For each pair of consecutive rings, the average distance or area (or decompose in fixed number of positions and use average distance/area for each position) is used.

6) Total volume of the piece.

7) External length of the piece.

8) Positioning of knots in relation to each other on the piece.

Although example scenarios discuss pieces (i.e., logs) of a cut tree, it should be appreciated that similar features can be applied to wood lumber. In order to keep track of the association between lumber and log, additional features can be considered. For example, this can include decomposing the log in pieces that have been used in the vector of features already and establish assignment (one-to-one relationship) between these individual pieces and in the log to the associated lumber. For this approach, one would have all the features (color, shape, number of rings, etc.) determined for each of its pieces, thus allowing cross-validation over the complete production chain. For example, the process can continue after cutting the tree, i.e., while processing wood lumber, and hence, adding more blocks to the respective blockchain. Additionally, the computer system 104 can also include additional features which can support the fragmentation process. For instance, the computer system 104 can generate IDs automatically to each piece; if automatically controlled, the computer system 104 would be able to check whether the volume of pieces derived from some log is reasonable. An additional feature could be the geometric position of the wood lumber in the log Each piece 116 has its own feature vector 202 (i.e., its own fingerprint) with features unique to that piece 116 along with characteristics of the resource 114 as a whole. The feature 1 can be number of lines, feature 2 can be average color, feature 3 can be volume, feature 4 can be minimum spacing between rings, feature 5 can be maximum spacing between rings, feature 6 can be defects, feature 7 can be size, weight, feature 8 can be shape, through feature M which can be other characteristic and/or a combination of any two or more characteristics. Some pieces 1-N 116 can have fewer or more features in the feature vector 202, and some of the features can be a null value if there is no appropriate characteristic to insert as a feature in the feature vector. The fingerprint software application 126 can input the data of features 1-M in various types of forms, and the forms of the data can be input as text (alphabets) and numbers, such as in ASCII, hexadecimal, binary, etc. The blockchain application 127 is configured to create a blockchain 204 for each of the feature vectors 202. A block/record in the blockchain 204 can include the tree ID, the piece ID (e.g., each individual piece 1-N 116), and the feature vector 202 for each piece 1-N 116. The blockchain 204 includes blocks/records 1-N which correspond on a one-to-one basis with 1-N separate feature vectors 202 for pieces 1-N, respectively. For example, block/record 1 contains feature vector 1 for piece 1 (i.e., piece ID 1), block/record 2 contains feature vector 2 for piece 2 (i.e., piece ID 2), through block N which container feature vector N for piece N (i.e., piece ID N).

The blockchain 204 can include an additional block/record a certificate 250 which is the information of and/or a summary of feature vectors 202. The certificate 250 can also include the origin of the resource 114. The certificate 250 can include a hash code associated with the feature vector 202. Additionally and/or alternatively, the certificate 250 can contain a link where the content of the feature vector 202 will be hosted.

The validation software application 128 of the computer system 104 is configured to validate that the information of the certificate 250 in the blockchain 204 is accurate and/or that records/blocks of the blockchain 204 are accurate. Further regarding validation is discussed herein.

Figure 4:
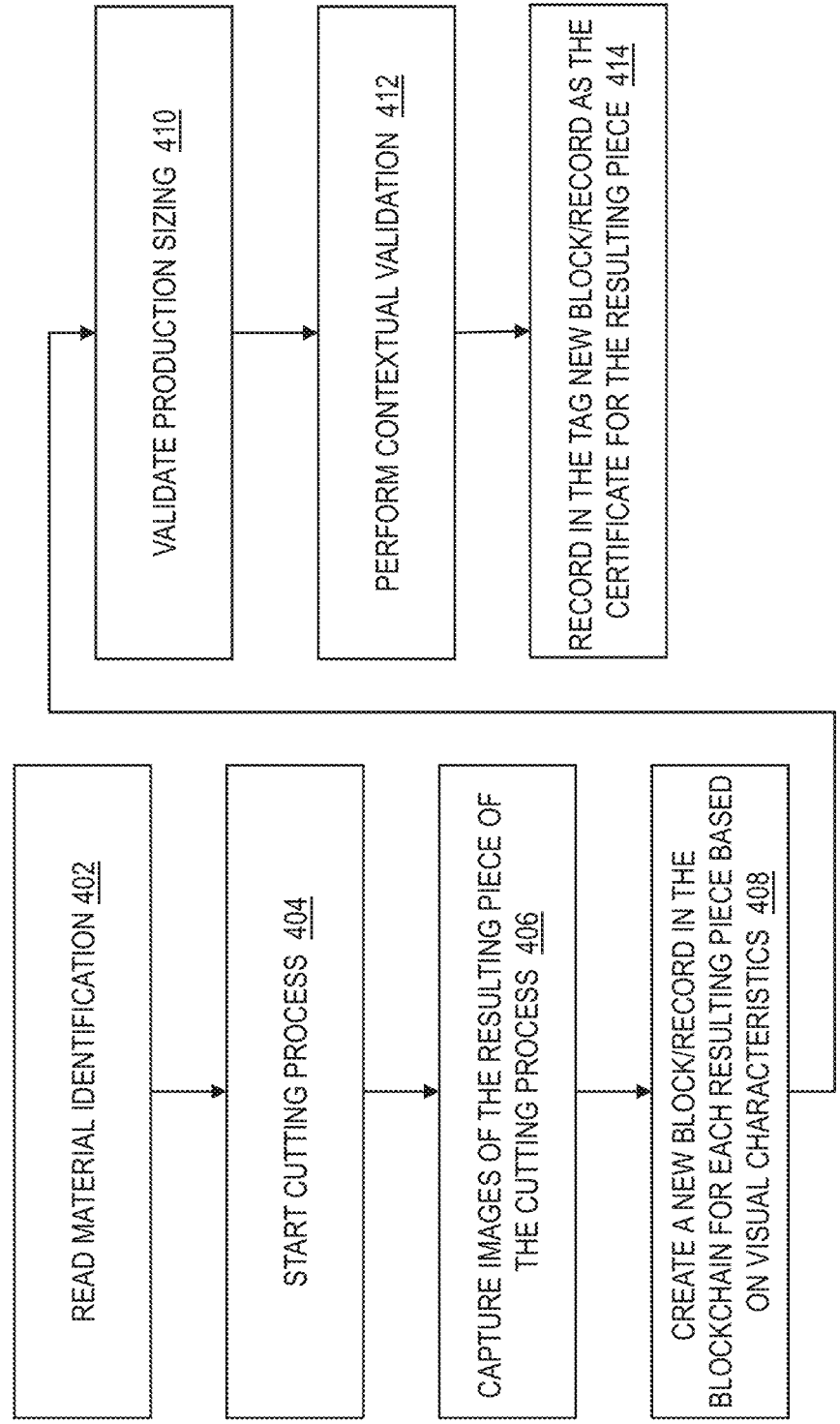
FIG. 4 depicts a flowchart of a method of tracking pieces of a resource related to the blockchain according to embodiments of the invention.

FIG. 4 depicts a flowchart 400 of a method of tracking pieces 1-N 116 of the resource 114 according to embodiments of the invention. At block 402, the sensor 106 of the manufacturing system 102 reads material identification of the resource 114. Material identification can be in the form of a radio-frequency identification (RFID) tag, integrated circuit (IC) tag, and/or any other tag allowing the registering of the origin of the object (i.e., resource 114). The material identification can be physically attached and/or associated with the resource 114 prior to cutting. In one or more embodiments of the invention involving wood processing, this tag could contain the first block related to the seed/sprout producer and the latitude and longitude where the tree was planted. Also, the sensor 106 can be configured to automatically generate material identification based on location from one or more GPS device 110.

At block 404, the manufacturing system 102 starts the manufacturing process and cuts the resource 114 into pieces 1-N 116. For example, the computer 140 can start the cutting process.

At block 406, the sensors 106 of the manufacturing system 102 capture images of the resulting pieces 1-N of the manufacturing process. As part of the process, the sensors 106 capture images related to each piece 1-N 116 of the main material (i.e., resource 114). The images can be in RGB and/or in any other part of the spectrum (e.g., near infrared) which highlights material characteristics. At this point, in some embodiments of the invention, the characteristics could be converted via computer vision algorithms of the computer vision application 124 into a feature vector 202 to be incorporated to the block of information for the blockchain 204. Although different software applications are illustrated in computer system 104, the functions and operations of two or more applications can be combined into a single software application.

At block 408, the blockchain application 127 of computer system 104 creates a new block/record of information 204 for each of the resulting pieces 1-N based on visual characteristics. The blockchain application 127 uses the key characteristics from the previous operation, for example a hash of the previous block/record, to create the next block/record of information for that one piece in the blockchain 204. The blockchain 204 illustrates blocks/records 1-N which respectively record feature vectors 1-N and/or data of feature vectors 1-N for each of the pieces 1-N.

At block 410, the validation application 128 of computer system 104 is configured to validate production sizing. For example, the validation application 128 checks whether the volume being extracted/produced is compatible with what is physically realizable by a particular tree, group of trees, and/or tract of land. This estimate can be based on historical data contained in the memory (e.g., knowledge base database 152) of computer system 104 and/or previously and currently accessed by the computer system 104.

At block 412, the validation application 128 is configured to perform a contextual validation. During the contextual validation, the validation application 128 checks whether the location (i.e., origin) where the product is being processed/extracted is indeed the same being registered and/or that has previously been registered, for example in database 132. This can be evaluated with the support of location sensors 116 having GPS devices 110. The validation processes in block 410 and 412 can be combined.

If the validation at block 410 and/or 412 is negative, this can indicate that some aspect of information related to origin, number, amount, volume, registration, etc., of the pieces 1-N 116 and/or resource 114 is incorrect. A negative in the validation at block 410 and/or 412 could be indicative of potential errors, fraud, etc., with respect to the pieces 1-N 116 and/or the resource 114. In some embodiments of the invention, the validation check in blocks 410 and/or 412 can occur after the blockchain 204 having certificate 250 has been created. For example, the validation processes in block 410 and/or 412 can be performed subsequent to the creation of the blockchain 204 and certificate 250, and the validation process at block 410 and/or 412 can determine that the information in certificate 250 is inaccurate because the certificate 250 could have been tampered with or altered at some later stage after its creation. Also, during the validation process, there can be functionalities to stop or forbid the registration of blocks by devices causing the issues, as the problem might not be related with attempts of counterfeiting, but with problems on devices and sensors used in the process. According to embodiments of the invention, FIG. 7 depicts a diagram in which the computer system 104 is configured to send an invalidation control signal to a control module 704A which controls movement/transportation of shipment container 702A, to control module 710B which controls movement/transportation of shipment container 702B, and/or to device 780 of personnel who is responsible for movement/transportation of shipment containers 702A and 702B. The invalidation control signal from computer system 104 is configured to cause an alert which can be audible and/or visual at the control module 704A, control module 704B, and/or device 780 of personnel. Also, the invalidation control signal from computer system 104 is configured to automatically cause the control module 704A, control module 704B, and/or device 780 of personnel to automatically stop, restrict, and/or redirect physical movement/transportation of the shipment container 702A and/or shipment container 702B. The shipment container 702A and/or shipment container 702B can be an autonomous vehicle, semi-autonomous vehicle, and/or a vehicle for transportation and/or be integrated on the autonomous vehicle, semi-autonomous vehicle, and/or vehicle. As such, the invalidation control signal from the computer system 104 causes the control module 704A to automatically control a servo/motor 710A to physically stop movement and/or redirect movement (back to a central location) for shipment container 702A. Similarly, the invalidation control signal from the computer system 104 causes the control module 704B to automatically control a servo/motor 710B to physically stop movement and/or redirect movement (back to a central location) for shipment container 702B. In some cases, the invalidation control signal from the computer system 104 causes the control module 704A and 704B to automatically control the servos/motors 710A and 710B, respectively, to physically stop movement and/or redirect movement (back to a central location) at or within a shipyard, distribution center, mail center, etc., for the shipment container 702A and/or the shipment container 702B, respectively.

Returning to FIG. 4, at block 414, the blockchain application 127 records in the blockchain 204 an additional block/record including certificate 250 for the pieces 1-N and resource 114. The certificate 250, as the additional block/record, now encapsulates origin information, planting time, harvesting time, visual characteristics, and details about manufacturing process for each of the pieces 1-N 116 and the resource 114. In some embodiments of the invention, this new tagging can be performed via RFID and placed in a physical tag associated with the pieces 1-N 116 and resource 114. In one case, the use of RFID is an alternative (and/or addition) to storage of the certificate 250 related to each piece, supporting individual validation when the visual validation is not possible. Also, the use of RFID can be part of the verification process (discussed above).

At block 416, the blockchain application 127 is configured to record in a distributed ledger 150 all procedures/steps performed during the manufacturing process and the blockchain 204 (including certificate 250), allowing for future tracing (validation) of products. The distributed ledger 150 can be the blockchain 204 which gets distributed for access by any device.

FIG. 5 depicts a flowchart 500 of a method of validating the certificate of a blockchain 204 related to the production process of pieces 1-N 116 of the resource 114 according to embodiments of the invention. At block 502, a consumer can use a device 610 to read the certificate associated with the blockchain 204 as illustrated in FIG. 6. FIG. 6 depicts a device 610 configured to scan/read information of a product 602 where the information is linked to the origin of the product according to embodiments of the invention. For example, FIG. 6 depicts one or more finished products 602 resulting from the initial processed material (from any of the pieces 1-N 116 of the resource 114), and the end consumer can use the device 610 (e.g., mobile device) to read/scan information present in a tag 604 of the product 602. The scanned information is related to and/or connected to the certificate 250. Alternatively and/or additionally, the consumer can input information from the tag 604 related to the certificate 250 into the device 610. The device 610 can be a mobile device such as a smart phone with a camera or image reader, a computer, laptop, etc. The device 610 includes one or more processors, computer executable instructions of a software application, transceiver/receiver, etc. The device 610 includes a software application that processes the information (from the tag 603) of the certificate 250 and transmits this information to the computer system 104 in order to validate the information of the certificate 250. The finished product 602 is a physical structure, which can be furniture, lumber, and other wood products assuming the scenario where the resource 114 is a tree. The finished product 602 can be from multiple resources 114 having respective certificate 250, and the information from the tag 604 relates to each of the certificates in order to verify the origin of the resources 114.

At block 504, the computer system 104 is configured to receive the certificate information from the device 610, and the computer system 104 loads blocks/traces of the blockchain 204 related to the tag 604 that was read by the device 610. At this point, the computer system 104 retrieves all steps/procedures recorded in the distributed ledger 150 (e.g., origin of the sprout/seed (for agriculture), planting time, harvesting time, visual characteristics, and manufacturing process details). In other words, the computer system 104 loads the recorded information of blockchain 204 for the pieces 1-N 116 of the resource 114.

At block 506, the computer system 104 is configured to validate production sizing (analogous to block 410). The validation considers the origin and production capabilities of the resource 114 identified in blockchain 204, and the validation application 128 checks for inconsistencies related to production capacity and products (including the product 602 and any other products 602 (that could belong to other consumers or stores) if all the pieces 1-N 116 were not exhausted when producing product 602) associated with that origin.

At block 508, the computer system 104 is configured to validate transport time (analogous to block 412). The validation considers the time required to transport the product 602 from the origin (including manufacturing process time) to the place the consumer is using the device 610 to perform the validation. The information related to consumer's location could be retrieved by the GPS device in the device 610 and/or any other technique allowing approximate location, e.g., via IP address, cell phone tower, routing servers, local stored the product 602 was purchased from, etc. In conjunction with the previous block 506, this phase involves validating the viability of producing and transporting any good to the hands of the user performing the validation and checking for inconsistencies.

At block 510, the computer system 104 returns to the device 610 the validity calculated for the certificate 250 of the product 602. For example, once the blockchain 204 for the certificate 250 has passed through all validations related to the pieces of information contained in the ledger 150 and/or blockchain 204 and the physical viability of the production and transport of the product have been validated, then the computer system 104 returns the validity of the certificate 250 to the device 610 of the consumer in FIG. 6. In some embodiments of the invention, the computer system 104 could retrieve the full trace and the validity status for each of the blocks contained in a blockchain technology.

The computer system 104 is configured to use the knowledge base 152 for the wood processing, and this knowledge base database 152 contains information about trees, slices of wood, and products resulting from manufacturing them. Through the knowledge base database 152, the computer system 104 is configured compute how many products have been derived from a particular tree slice (including how many tons of extracted wood have been used to produce final products), and thus the computer system 104 uses knowledge base database 152 for validating whether a reasonable amount of products have been produced from a given tree (e.g., resource 114).

FIG. 8 depicts a flowchart 800 of a computer implemented method for a manufacturing process according to embodiments of the invention. At block 802, the computer system 104 is configured to receive material identification (e.g., tree ID, such as 0001XYZ) of a resource (e.g., 114) being manufactured.

At block 804, the computer system 104 is configured to receive images captured of units (e.g., pieces 1-N 116) of the resource (e.g., 114), the resource having been cut into the units. For example, the computer system 104 receives images from the sensors 106 of the manufacturing system 102. The images are of the resource 114 as a whole and the individual pieces 1-N 116.

At block 806, the computer system 104 is configured to determine features for each of the units from the images. The computer system 104 can also determine features of the resource 114 as a whole. The computer vision application 124 is configured to process the images to determine the features, also referred to as characteristics, of the pieces 1-N and the resource 114.

At block 808, the computer system 104 is configured to create feature vectors on a one-to-one basis for each of the units (e.g. pieces 1-N 116). For example, the fingerprint application 126 is configured to create feature vector 202 for each piece 1-N 116. Each feature vector 202 contains features 1-M (or characteristics) of that particular piece 116, such as, one feature vector 202 for piece 1, one feature vector 202 for piece 2, and so forth through one feature vector 202 for piece N.

At block 810, the computer system 104 is configured to form a blockchain 204 using the feature vectors 202 associated with each of the units, the blockchain 204 including the material identification of the resource 114 and a certificate 250 identifying the units. The blockchain application 127 is configured to create the records/blocks of the blockchain 204, where a feature vector 202 has its own record/block for an individual piece 1-N 116. The blockchain 204 also includes one or more records/blocks of the certificate 250. The certificate 250 can include among other things origin information, planting time, harvesting time, visual characteristics, and details about manufacturing process for each of the pieces 1-N 116 of the resource 114. The certificate 250 can include the same or a summary of the information in the features vectors 202 for each of the feature vectors 202. At block 812, the computer system 104 is configured to validate via the blockchain 204 a feasibility/authenticity of the certificate 250 for the units (e.g., pieces 1-N 116) of the resource 114.

Validating via the blockchain 204 the feasibility of the certificate 250 for the units of the resource includes checking (e.g., using the validation application 128) that a volume of the units produced is within a predefined range of volumes for a target resource. For example, the target resource is a predefined resource of substantially the same volume (i.e., substantially the same dimensions which apply such as length, diameter/circumference, height, weight/mass, width, etc.). For example, if the resource 114 is a tree, the target resource is a similar size tree selected by the validation application 128 from the knowledge base database 152. The validation application 128 performs a comparison of the volume in the certificate 250 and/or the volume added up from the records/blocks having information of the feature vectors 202 to the volume of the target resource to check whether the volume of the certificate 250 is in the predefined range of volumes for the target resource in the knowledge base database 152.

In response to the computer system 104 determining that a volume of the units (e.g., pieces 1-N) from the resource 114 is not within a predefined range of volumes for a target resource, the computer system 104 is configured to cause an alert associated with a transportation of one or more of the units. For example, the computer system 104 can cause an alert at a computing device 780 of transportation personnel (a person) and/or at a control module 704B indicating that the transportation of one or more shipment containers 702B should be stopped at a shipment yard, mail facility, and/or distribution facility because of failed validation/authenticity. The computer system 104 is configured to cause a stoppage of the transportation of the one or more of the units. For example, the computer system 104 is configured to transmit a control signal to a control module 704B that stops the movement of any shipping container 702B containing one or more of the pieces 1-N.

In response to the computer system 104 determining that a volume of the units (e.g., pieces 1-N) from the resource is not within a predefined range of volumes for a target resource, the computer system 104 is configured to cause an alert associated with a transportation of one or more products derived from the units. For example, the computer system 104 can cause an alert at a computing device 780 of transportation personnel (a person) and/or at a control module 704A indicating that the transportation of one or more shipment containers 702A should be stopped at a shipment yard, mail facility, and/or distribution facility because of failed validation/authenticity. The computer system 104 is configured to cause a stoppage of the transportation of the one or more products derived from the units. For example, the computer system 104 is configured to transmit a control signal to a control module 704A that stops the movement of any shipping container 702A containing one or more of the products.

The computer system 104 is configured to validate via the blockchain 204 the feasibility of the certificate 250 for the units of the resource 114 which includes the validation application 128 checking that a location on the certificate identifying where the units are produced matches a previously registered location, and in response to the location not matching the previously registered location, the computer system 104 is configured to cause a stoppage of a transportation, the transportation is selected from the group consisting of the transportation of one or more of the units (e.g., stopping movement of the shipment container 702B) and the transportation of one or more products derived from the units (e.g., stopping movement of the shipment container 702A).

The blockchain 204 is based upon hash functions of sequential records, such that a subsequent alteration to any of the sequential records is detectable. The sequential records are respectively associated with the feature vectors 202 of each of the units, the material identification (e.g., tree ID), and the resource 114.

FIG. 9 illustrates an example of a computer 900 which can be utilized in any aspects as discussed herein according to embodiments of the invention. Various operations and configurations discussed above can utilize the capabilities of the computer 900. For example, one or more of the capabilities of the computer 900 can be incorporated in any element, module, application, component, device, computer, computer system, system, sensors, etc., to operate and functions as discussed herein for FIGS. 1-8.

The computer 900 includes, but is not limited to, PCs, workstations, laptops, PDAs, palm devices, servers, storages, mainframes, and the like. Generally, in terms of hardware architecture, the computer 900 can include one or more processors 910, memory 920, and one or more I/O devices 970 that are communicatively coupled via a local interface (not shown). The local interface can be, for example, but not limited to, one or more buses or other wired or wireless connections, as is known in the art. The local interface can have additional elements, such as controllers, buffers (caches), drivers, repeaters, and receivers, to enable communications. Further, the local interface can include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 can be a semiconductor based microprocessor (in the form of a microchip) or a macroprocessor.

The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 can incorporate electronic, magnetic, optical, and/or other types of storage media. Note that the memory 920 can have a distributed architecture, where various components are situated remote from one another but can be accessed by the processor 910.

The software in the memory 920 can include one or more separate programs, each of which includes an ordered listing of executable instructions for implementing logical functions. The software in the memory 920 includes a suitable operating system (O/S) 950, compiler 990, source code 930, and one or more applications 960 in accordance with embodiments of the invention. As illustrated, the application 960 includes numerous functional components for implementing the features and operations discussed herein. The application 960 of the computer 900 can represent various applications, computational units, logic, functional units, processes, operations, virtual entities, and/or modules in accordance with embodiments of the invention, but the application 960 is not meant to be a limitation.

The operating system 950 controls the execution of other computer programs, and provides scheduling, input-output control, file and data management, memory management, and communication control and related services. It is contemplated that the application 960 for implementing embodiments of the invention can be applicable on commercially available operating systems.

Application 960 can be a source program, executable program (object code), script, or any other entity including a set of instructions to be performed. When a source program, then the program is usually translated via a compiler (such as the compiler 940), assembler, interpreter, or the like, which might or might not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, ASP scripts, FORTRAN, COBOL, Perl, Java, ADA, .NET, and the like.

The I/O devices 970 can include input devices such as, for example but not limited to, a mouse, keyboard, scanner, microphone, camera, touch screen, joystick, etc. Furthermore, the I/O devices 970 can also include output devices, for example but not limited to storage devices, printers, display, etc. Finally, the I/O devices 970 can further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 can further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable storage medium for use by or in connection with any computer related system or method. In the context of this document, a computer readable storage medium can be an electronic, magnetic, optical, or other physical device or means that can contain or store a computer program for use by or in connection with a computer related system or method.

The application 960 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium can include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In embodiments of the invention, where the application 960 is implemented in hardware, the application 960 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for a manufacturing process used to validate authenticity of a resource, the computer-implemented method comprising:
   receiving, by a computer system, a material identification of the resource being manufactured;
   receiving images captured of units of the resource, an entirety of the resource having been cut into the units;
   determining features for each of the units from the images;
   creating feature vectors on a one-to-one basis for each of the units;
   forming a blockchain using the feature vectors associated with each of the units which form the entirety of the resource along with a characteristic of the entirety of the resource, the blockchain comprising the material identification of the entirety of the resource and a certificate identifying the units of the entirety of the resource;

validating via the blockchain a feasibility of the certificate for the units of the entirety of the resource by confirming that the units in the certificate are compatible for physically realizing the entirety of the resource; and returning a result of the validating for display on an output device.

2. The computer-implemented method of claim 1, wherein validating via the blockchain the feasibility of the certificate for the units of the resource comprises checking that a volume of the units produced is within a predefined range of volumes for a target resource.

3. The computer-implemented method of claim 1 further comprising in response to determining that a volume of the units from the resource is not within a predefined range of volumes for a target resource, causing an alert associated with a transportation of one or more of the units.

4. The computer-implemented method of claim 3 further comprising causing a stoppage of the transportation of the one or more of the units.

5. The computer-implemented method of claim 1 further comprising in response to determining that a volume of the units from the resource is not within a predefined range of volumes for a target resource, causing an alert associated with a transportation of one or more products derived from the units.

6. The computer-implemented method of claim 5 further comprising causing a stoppage of the transportation of the one or more products derived from the units.

7. The computer-implemented method of claim 1, wherein validating via the blockchain the feasibility of the certificate for the units of the resource comprises:
checking that a location on the certificate identifying where the units are produced matches a previously registered location; and
in response to the location not matching the previously registered location, causing a stoppage of a transportation, the transportation is selected from the group consisting of the transportation of one or more of the units and the transportation of one or more products derived from the units.

8. The computer-implemented method of claim 1, wherein the blockchain is based upon hash functions of sequential records, such that a subsequent alteration to any of the sequential records is detectable.

9. The computer-implemented method of claim 8, wherein the sequential records are respectively associated with the feature vectors of each of the units, the material identification, and the resource.

10. A system for a manufacturing process used to validate authenticity of a resource, the system comprising:
a processor; and
memory comprising computer-executable instructions that, when executed by the processor, cause the processor to perform a method comprising:
receiving a material identification of the resource being manufactured;
receiving images captured of units of the resource, an entirety of the resource having been cut into the units;
determining features for each of the units from the images;
creating feature vectors on one-to-one basis for each of the units;
forming a blockchain using the feature vectors associated with each of the units which form the entirety of the resource along with a characteristic of the entirety of the resource, the blockchain comprising the material identification of the entirety of the resource and a certificate identifying the units of the entirety of the resource;
validating via the blockchain a feasibility of the certificate for the units of the resource by confirming that the units in the certificate are compatible for physically realizing the entirety of the resource; and
returning a result of the validating for display on an output device.

11. The system of claim 10, wherein validating via the blockchain the feasibility of the certificate for the units of the resource comprises checking that a volume of the units produced is within a predefined range of volumes for a target resource.

12. The system of claim 10 further comprising in response to determining that a volume of the units from the resource is not within a predefined range of volumes for a target resource, causing an alert associated with a transportation of one or more of the units.

13. The system of claim 12 further comprising causing a stoppage of the transportation of the one or more of the units.

14. The system of claim 10 further comprising:
in response to determining that a volume of the units from the resource is not within a predefined range of volumes for a target resource, causing an alert associated with a transportation of one or more products derived from the units; and
causing a stoppage of the transportation of the one or more products derived from the units.

15. The system of claim 10, wherein validating via the blockchain the feasibility of the certificate for the units of the resource comprises:
checking that a location on the certificate identifying where the units are produced matches a previously registered location; and
in response to the location not matching the previously registered location, causing a stoppage of a transportation, the transportation is selected from the group consisting of the transportation of one or more of the units and the transportation of one or more products derived from the units.

16. The system of claim 10, wherein the blockchain is based upon hash functions of sequential records, such that a subsequent alteration to any of the sequential records is detectable.

17. The system of claim 16, wherein the sequential records are respectively associated with the feature vectors of each of the units, the material identification, and the resource.

18. A computer program product for a manufacturing process used to validate authenticity of a resource, the computer program product comprising a computer readable storage medium having program instructions embodied therewith, wherein the computer readable storage medium is not a transitory signal per se, the program instructions executable by a computer to cause the computer to perform a method comprising:
receiving, by the computer, a material identification of the resource being manufactured;
receiving images captured of units of the resource, an entirety of the resource having been cut into the units;

determining features for each of the units from the images;

creating feature vectors on one-to-one basis for each of the units;

forming a blockchain using the feature vectors associated with each of the units which form the entirety of the resource along with a characteristic of the entirety of the resource, the blockchain comprising the material identification of the entirety of the resource and a certificate identifying the units;

validating via the blockchain a feasibility of the certificate for the units of the entirety of the resource by confirming that the units in the certificate are compatible for physically realizing the entirety of the resource; and returning a result of the validating for display on an output device.

19. The computer program product of claim 18, wherein validating via the blockchain the feasibility of the certificate for the units of the resource comprises checking that a volume of the units produced is within a predefined range of volumes for a target resource.

20. The computer program product of claim 18 further comprising in response to determining that a volume of the units from the resource is not within a predefined range of volumes for a target resource, causing an alert associated with a transportation of one or more of the units.

* * * * *